Jan. 21, 1964
A. E. VOKES
3,118,564
SEPARATING HELICAL SPRINGS
Filed March 27, 1961
2 Sheets-Sheet 1
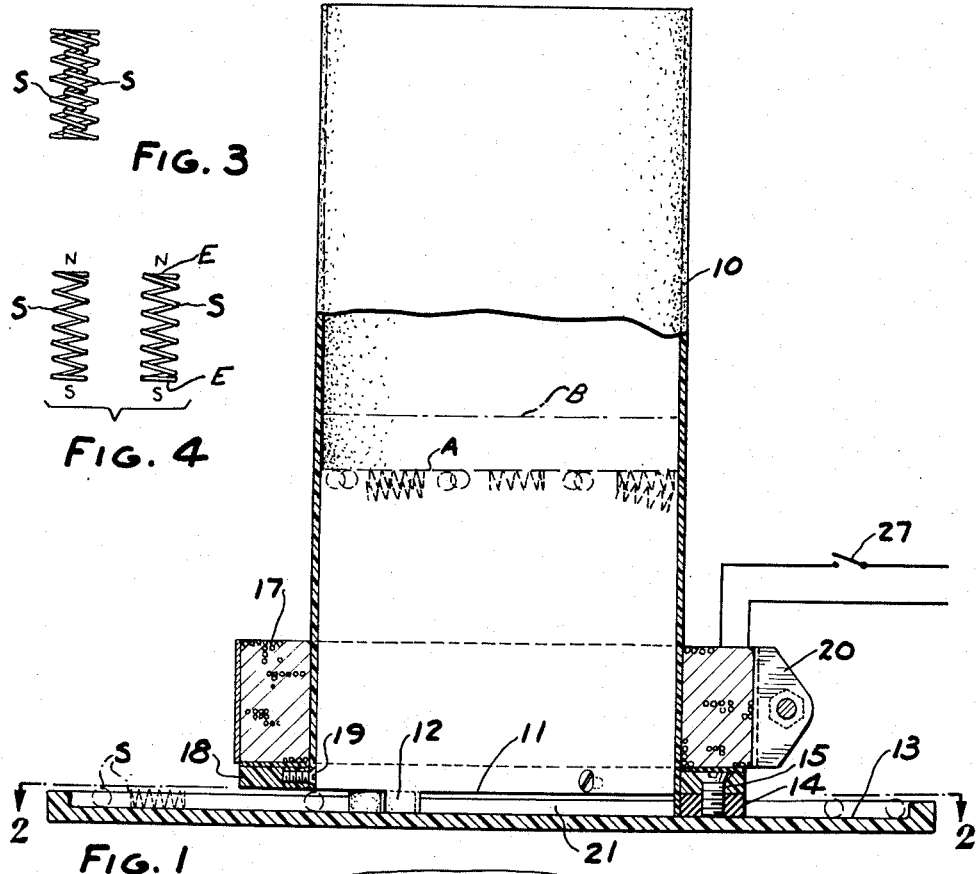
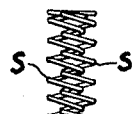
FIG. 3
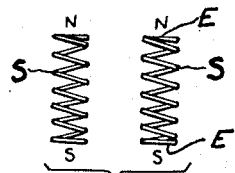
FIG. 4
FIG. 1
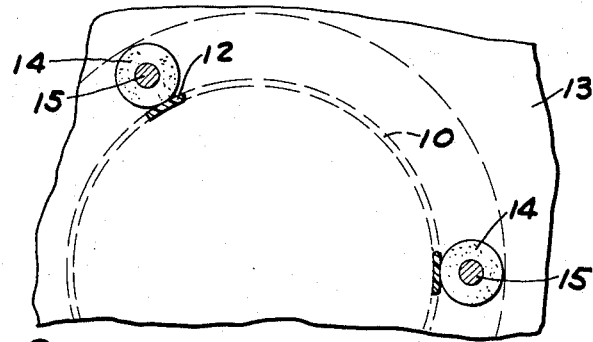
FIG. 2
INVENTOR.
ALEXANDER E. VOKES
BY
ATTORNEYS Jan. 21, 1964      A. E. VOKES      3,118,564
SEPARATING HELICAL SPRINGS
Filed March 27, 1961      2 Sheets-Sheet 2

INVENTOR.
ALEXANDER E. VOKES
BY
ATTORNEYS

3,118,564
SEPARATING HELICAL SPRINGS
Alexander E. Vokes, 17305 Forrer, Detroit 36, Mich.
Filed Mar. 27, 1961, Ser. No. 98,613
10 Claims. (Cl. 221—1)

This invention relates to the handling of loosely wound helical springs and particularly to the separating of such helical springs which become entangled with one another.

In certain assembly operations of parts which utilize small loosely wound helical springs, a major problem exists in that when the mass of springs is handled, there is a tendency for the springs to become entangled with one another. It is customary to utilize workers and manually separate these springs in order that they can be fed to a machine for assembly purposes.

It is an object of this invention to provide a method and apparatus for separating helical springs which become entangled.

It is a further object of the invention to provide such an apparatus which is relatively inexpensive, simple in construction and requires a minimum of maintenance.

Basically, the invention comprises laterally confining a mass of the loosely wound helical springs and periodically applying and removing a magnetic field to the mass. The periodic applying and removing of a magnetic field momentarily causes entangled springs to have a north and south pole. When two springs are entangled, the ends of the two springs will both be north poles and south poles, respectively, so that they will repel one another tending to disentangle the springs. This combined with the slight agitation of the mass of springs causes the springs to become disentangled permitting them to be moved and passed outwardly by gravity from beneath the mass which is confined.

In the drawings:

FIG. 1 is a sectional elevational view of an apparatus embodying the invention.

FIG. 2 is a fragmentary sectional view taken along the line 2—2 in FIG. 1.

FIG. 3 is a view of entangled springs which are to be separated by the apparatus.

FIG. 4 is a partly diagrammatic view showing adjacent disentangled springs.

Figure 5:
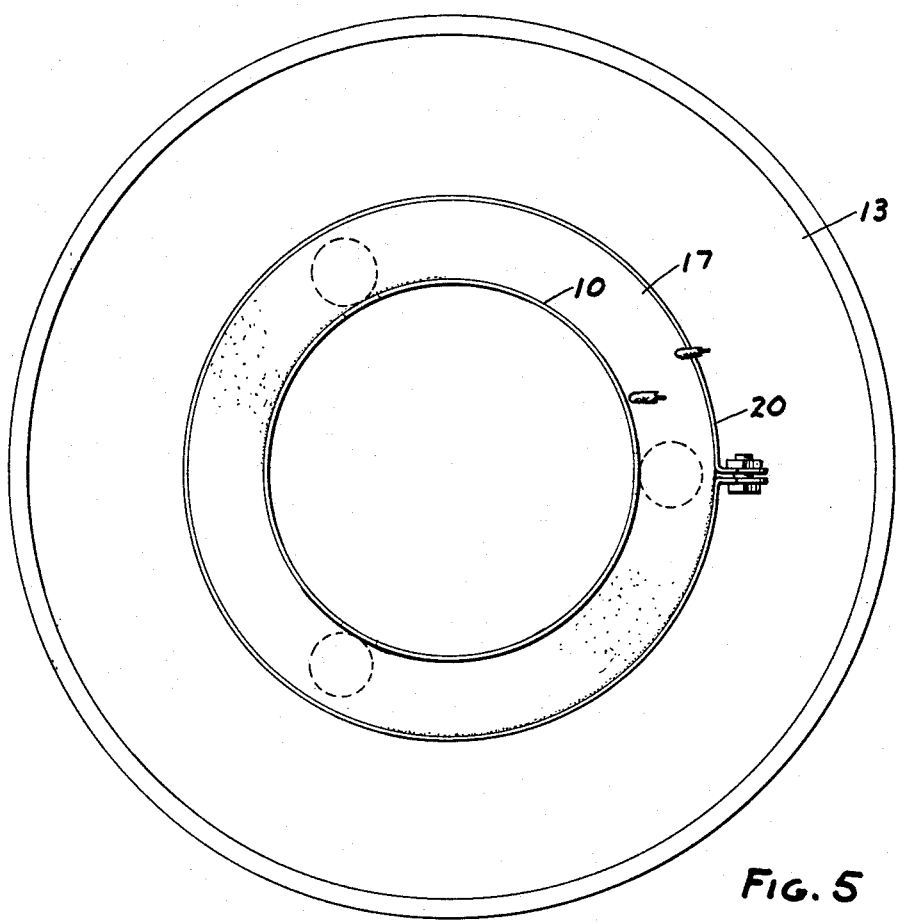
FIG. 5 is a plan view of the apparatus shown in FIG. 1.

Referring to FIGS. 1, 2 and 5, the apparatus comprises a tube 10 of dielectric material such as plastic which has its upper and lower ends of open. Portions of the lower end of the tube 10 are cut away as at 11 providing feet 12 that rest upon a plate 13 that is substantially flat and extends beyond the periphery of the tube 10. The plate 13 is made of a dielectric material such as plastic.

As shown in FIG. 2, the tube 10 is confined on plate 13 by bosses 14 that are fixed to the legs 12 and screws 15 of non-magnetic material that extend through the bosses into projections 16 fixed to the plate 13.

A magnetic coil 17 is provided around the lower end of the tube 10 and is supported on an annular ring 18 of dielectric material such as plastic which is held in position on the tube by screws 19 of non-magnetic material. A clamp 20 is provided around the coil 17 to confine and hold the coil.

The springs S which are to be separated are shown in FIG. 4, each spring comprising a wire bent into helical form. In springs of this type, the ends E are conventionally flat. Such springs have a tendency to become entangled with each other as shown in FIG. 3.

A mass of the springs S is introduced into the open upper end of tube 10. The portions 11 that are cut away provide spaces 21 that have a height substantially equal to the diameter of the springs S so that any separated springs can roll laterally outwardly onto the periphery of plate 13 from which they can be removed or, alternatively, from which they can move along a chute to a machine for assembly with other parts.

Figure 6:
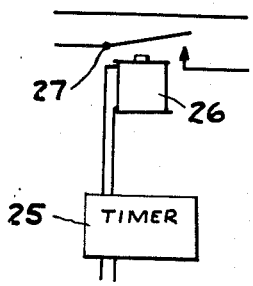
FIG. 6 is a schematic diagram of an electrical circuit for the apparatus.

Means are provided for periodically applying electrical current to the coil 17. As shown in FIG. 6, this comprises a timer 25 that periodically energizes a solenoid 26 that opens and closes the switch 27 that supplies current to the coil. Although alternating current is preferred, direct current may also be applied.

The mass of springs in tube 10 is such that the upper end of the mass is substantially above the upper end of the coil as shown at A in FIG. 1 when the coil is not energized and yet not so great that it will not be lifted by the magnetic action of the coil 17. When the coil is energized, the mass is lifted upwardly to the position B shown in FIG. 1. When the coil is again de-energized, the mass is permitted to fall downwardly.

The successive energization and de-energization of the coil causes the springs to be separated and the individual springs adjacent the lower end of the mass are then permitted to roll outwardly by the vibration of the overlying mass of springs through the spaces 21 onto the plate 13.

The separation of the springs is achieved primarily by periodic magnetic field, supplemented by the slight agitating affect. Referring to FIG. 3, when two springs S are entangled as shown in FIG. 3 and the magnetic coil is energized, the springs are momentarily magnetized so that one end of the combined springs is made a north pole and the other end is made a south pole. Since there are two distinct but entangled elements, the two ends of the springs that are adjacent one another and are north poles repel each other as do the opposite ends which are south poles. This causes the two springs to separate from one another. This combined with the slight agitation of the mass upwardly and downwardly causes a ready separation of the springs.

It can be appreciated that an inclined rather than a flat plate 13 can be provided on the lower end of the tube so that all the springs tend to collect in one area when they are separated from which area they can be manually removed or removed through chutes or other means.

Instead of providing openings adjacent the lower end of the tube 10, slots having a length and width substantially equal to the length and diameter of the springs can be provided in the plate 13 within the confines of the tube so that as the springs are separated and become aligned with the slots they will drop through the slots.

A typical example of a satisfactory spring separator that has been used for separating springs made of steel and being approximately five-eighths of an inch in length and five-sixteenths of an inch in diameter has the following dimensions:

| | |
|---|---|
| Inside diameter of coil | 6 inches. |
| Outside diameter of coil | 8 inches. |
| Number of turns | 620. |
| Size of wire | No. 17. |
| Diameter of wire | .049 with insulation. |
| Height of coil | 2 inches. |
| Width of coil | 1 inch. |
| Diameter of tube | 6 inches. |

When a current of 230 volts is successively and periodically applied to such an arrangement for periods of one second "on" and three seconds "off," the desired separation of the springs is achieved.

Because of the rapid separation of the springs, an apparatus embodying the invention can be used for a very short period of time to separate a large quantity of springs for manufacturing operations.

It can thus be seen that I have provided a method and apparatus for readily separating loosely wound helical springs which may become entangled with one another. The apparatus is relatively simple, inexpensive to construct and operate and requires a minimum of maintenance. As a result, substantial saving is made in labor.

I claim:

1. The method of separating wound helical springs and similar articles which may become entangled which comprises providing a free lateral path for at least one of said springs and periodically applying and removing a magnetic field to the entangled springs to create a north and south pole in said springs so that the entangled springs having identical poles at adjacent ends tend to repel one another thereby disentangling from one another by said one spring only moving along said path.

2. The method of separating wound helical springs and similar articles which may become entangled which comprises laterally confining a mass of the springs but providing a free lateral path for at least one entangled spring, and periodically applying and removing a magnetic field to the laterally confined mass to project said spring along said path.

3. The method of separating and dispensing wound helical springs and similar articles which may become entangled which comprises laterally confining a mass of the springs, providing a free path beneath said confined mass and laterally of at least one spring, periodically applying and removing a magnetic field to the laterally confined mass along said path, and permitting separated springs to move laterally from beneath said confined mass during the periods when the magnetic field is not being applied.

4. An apparatus for separating wound helical springs and similar articles which may become entangled which comprises means for laterally confining a mass of springs, means adjacent the lower end of said mass defining an opening through which disentangled springs may move, a coil surrounding said laterally confining means, and means for periodically energizing and de-energizing said coil to periodically magnetize the mass of springs.

5. An apparatus for separating wound helical springs and similar articles which may become entangled which comprises means for laterally confining a mass of the springs above a surface, means defining an opening whereby disentangled springs may move from said mass laterally outwardly onto and along said surface, a coil surrounding said laterally confining means, and means for periodically energizing and de-energizing said coil to periodically magnetize the mass of springs.

6. An apparatus for separating and dispensing loosely wound helical springs and similar articles which may become entangled which comprises a wall of dielectric material defining a chamber, means adjacent the lower end of said wall defining a surface, said wall having portions thereof spaced from said surface to permit individual separated springs to move laterally from within the wall to the exterior of the wall along said surface, a coil surrounding said wall, and means for periodically energizing said coil to create a periodic magnetic field within said wall.

7. An apparatus for separating and dispensing loosely wound helical springs and similar articles which may become entangled with one another, which apparatus comprises a tube of dielectric material, means defining a surface adjacent the lower end of the tube, said tube having portions thereof spaced from said surface a distance sufficient to permit individual springs to move laterally outwardly from within the confines of said tube along said surface, a coil around said tube, and means for periodically energizing said coil to create a periodic magnetic field within said tube.

8. The method of separating and dispensing wound helical springs and similar articles which may become entangled which comprises laterally confining a mass of the articles within a coil, providing a free path beneath said coil and laterally of an entangled spring, periodically applying and removing current to said coil, and permitting separated springs to move laterally along said path from beneath said coil during the periods when the current is not being supplied to said coil.

9. The method set forth in claim 8 wherein current is supplied to said coil for a period of about one second and is removed from said coil for a period of about three seconds.

10. An apparatus for separating and dispensing loosely wound helical springs and similar articles which may become entangled which comprises a wall of dielectric material defining a chamber, means on the lower end of said wall for holding said wall in spaced relation to a surface with relation to which said wall is positioned, so that individual separated articles may move laterally from within the wall to the exterior of the wall along the surface, a coil surrounding said wall, and means for periodically energizing said coil to create a periodic magnetic field within said wall.

References Cited in the file of this patent

UNITED STATES PATENTS

| | | |
|---|---|---|
| 2,581,042 | Otto | Jan. 1, 1952 |
| 2,820,632 | Fowler | Jan. 21, 1958 |
| 2,999,687 | Hommel | Sept. 12, 1961 |